(12) United States Patent
Matway et al.

(10) Patent No.: US 9,763,390 B2
(45) Date of Patent: Sep. 19, 2017

(54) LATCH MECHANISM FOR AGRICULTURAL HARVESTER CONCAVES

(71) Applicant: CNH Industrial America LLC, New Holland, PA (US)

(72) Inventors: Michael J. Matway, Litchfield, IL (US); Travis Ohms, Davenport, IA (US); Craig E. Murray, Davenport, IA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 0 days.

(21) Appl. No.: 14/884,857

(22) Filed: Oct. 16, 2015

(65) Prior Publication Data

US 2017/0105351 A1 Apr. 20, 2017

(51) Int. Cl.
| | | |
|---|---|---|
| *A01F 12/24* | (2006.01) | |
| *E05B 83/00* | (2014.01) | |
| *A01F 12/18* | (2006.01) | |
| *A01F 12/28* | (2006.01) | |
| *A01F 7/02* | (2006.01) | |
| *A01F 12/44* | (2006.01) | |

(52) U.S. Cl.
CPC .......... *A01F 12/24* (2013.01); *A01F 12/185* (2013.01); *A01F 12/28* (2013.01); *E05B 83/00* (2013.01); *A01F 7/02* (2013.01); *A01F 12/444* (2013.01); *A01F 12/446* (2013.01)

(58) Field of Classification Search
CPC combination set(s) only.
See application file for complete search history.

(56) References Cited

U.S. PATENT DOCUMENTS

| | | | |
|---|---|---|---|
| 2,959,175 A | 11/1960 | Oberholtz et al. | |
| 3,101,721 A | 8/1963 | Fuller | |
| 3,568,682 A * | 3/1971 | Knapp | A01F 12/24 460/108 |
| 3,957,058 A * | 5/1976 | Komancheck | A01F 12/28 460/108 |
| 4,988,326 A | 1/1991 | Bennett | |
| 5,919,087 A | 7/1999 | Strong et al. | |
| 5,993,313 A | 11/1999 | Healy et al. | |
| 6,398,639 B1 * | 6/2002 | Dammann | A01F 12/26 460/107 |
| 7,001,268 B2 | 2/2006 | Puryk et al. | |
| 2005/0176483 A1 | 8/2005 | Schenk | |

OTHER PUBLICATIONS

EP16193923.6, Extended European Search Report, dated Jan. 17, 2017, 7 pages.

* cited by examiner

*Primary Examiner* — Alicia Torres
(74) *Attorney, Agent, or Firm* — Peter K. Zacharias; Patrick M. Sheldrake

(57) ABSTRACT

An agricultural harvesting machine includes a chassis and a threshing system carried by the chassis. The threshing system includes a rotor, a frame assembly and at least one concave carried by the frame assembly. A latch mechanism supports and secures the concave relative to the frame assembly and includes a concave support bar, a clamping bar and a quick-connect, over center latch for tool-less operation.

20 Claims, 7 Drawing Sheets

LATCH MECHANISM FOR AGRICULTURAL HARVESTER CONCAVES

BACKGROUND OF THE INVENTION

1. Field of the Invention

The present invention relates generally to agricultural harvesters such as combines, and more particularly to threshing or separating systems of such combines, and still more particularly to systems or structures for securing concaves in the threshing systems of such combines.

2. Description of the Related Art

An agricultural harvester known as a "combine" is historically termed such because it combines multiple harvesting functions, such as picking or cutting, threshing, separating and cleaning in a single harvesting machine. A typical combine includes a header which removes the crop from a field, and a feeder housing which transports the crop matter into a threshing rotor. The threshing rotor rotates within a perforated housing, which may be in the form of adjustable concaves, and performs a threshing operation on the crop, to dislodge the grain from other crop material. Once the grain is threshed, it falls through perforations in the concaves onto a grain pan. From the grain pan, the grain is cleaned on sieves in a cleaning system. A cleaning fan blows air through the sieves to discharge chaff and other debris toward the rear of the combine. Non-grain crop material, such as straw from the threshing system, proceeds through a residue system, which may utilize a straw chopper to process the non-grain material and direct it out the rear of the combine. The cleaned grain is transported to a grain tank onboard the combine. When the grain tank becomes full, the combine is positioned adjacent a vehicle into which the grain is to be unloaded, such as a semi-trailer, gravity box, straight truck, or the like; and an unloading system on the combine is actuated to transfer the grain from the grain tank into the vehicle.

More particularly, a rotary threshing or separating system includes one or more rotors which can extend axially (front to rear) or transversely (side to side) within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to the cleaning system. Alternatively, the grain and finer non-grain crop material may also fall directly onto the cleaning system itself.

The cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve is discharged at the rear of the combine. Grain falling through the lower sieve lands on a bottom pan of the cleaning system, where it is conveyed forwardly toward a clean grain auger. The clean grain auger conveys the grain to a grain tank for temporary storage.

The concaves of the combine threshing system need to be changed for harvesting different types of crops. For optimum performance, concaves need to be replaced if excessively worn or damaged. It is known to secure concaves using threaded fasteners, such as bolts and the like, which require tools both for releasing the fasteners to disengage a concave for removal and to engage and tighten the fasteners to secure a replacement concave in position. Removing and replacing concaves with known securing systems can be difficult and time-consuming under shop conditions and even more difficult if performed in the field during a harvesting operation, when time is critical and nonproductive harvesting time is costly.

What is needed in the art is a concave securing system that can be operated more efficiently under typically experienced conditions to facilitate removal and installation of concaves in an agricultural harvester.

SUMMARY OF THE INVENTION

The present invention provides a concave securing mechanism having a latch mechanism that can be operated without tools under typically experienced conditions, for securing and releasing concaves in an agricultural harvester.

The invention in one form is directed to an agricultural harvester provided with a chassis and a threshing system carried by the chassis. The threshing system includes a rotor, a frame assembly and a concave including a securement portion. A securing mechanism connects the concave to the frame assembly and includes a support component in a fixed location relative to the frame assembly, a securing component movable relative to the support component, and a tool-less latch mechanism interconnecting the support component and the securing component with the securement portion captured between the support component and the securing component.

The invention in another form is directed to a threshing system of an agricultural harvester provided with a frame assembly, a concave including a plurality of securement portions, and a securing mechanism connecting the concave to the frame assembly. The securing mechanism includes a support bar axially rotatable at a fixed location relative to the frame assembly, a clamping bar movable relative to the support bar and applying clamping force against the plurality of securement portions, and a tool-less latch mechanism interconnecting the support bar and the clamping bar.

The invention in yet another form is directed to a securing mechanism connecting a concave to a frame assembly in an agricultural combine, provided with a plurality of securement portions extending from the concave, a support bar axially rotatable at a fixed location relative to the frame assembly and a clamping bar movable relative to the support bar and applying clamping force against the plurality of securement portions. A latch mechanism pivotally connects the clamping bar to the support bar.

The present invention, in a form thereof, advantageously provides a latch mechanism for concaves that operates quickly to release an installed concave and to secure a replacement concave in a combine harvester threshing system.

Another advantage of a form of the present invention is that the latch mechanism can be manipulated without the need for tools.

Yet another advantage of the present invention is that the latch mechanism can be operated easily and quickly, saving time.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
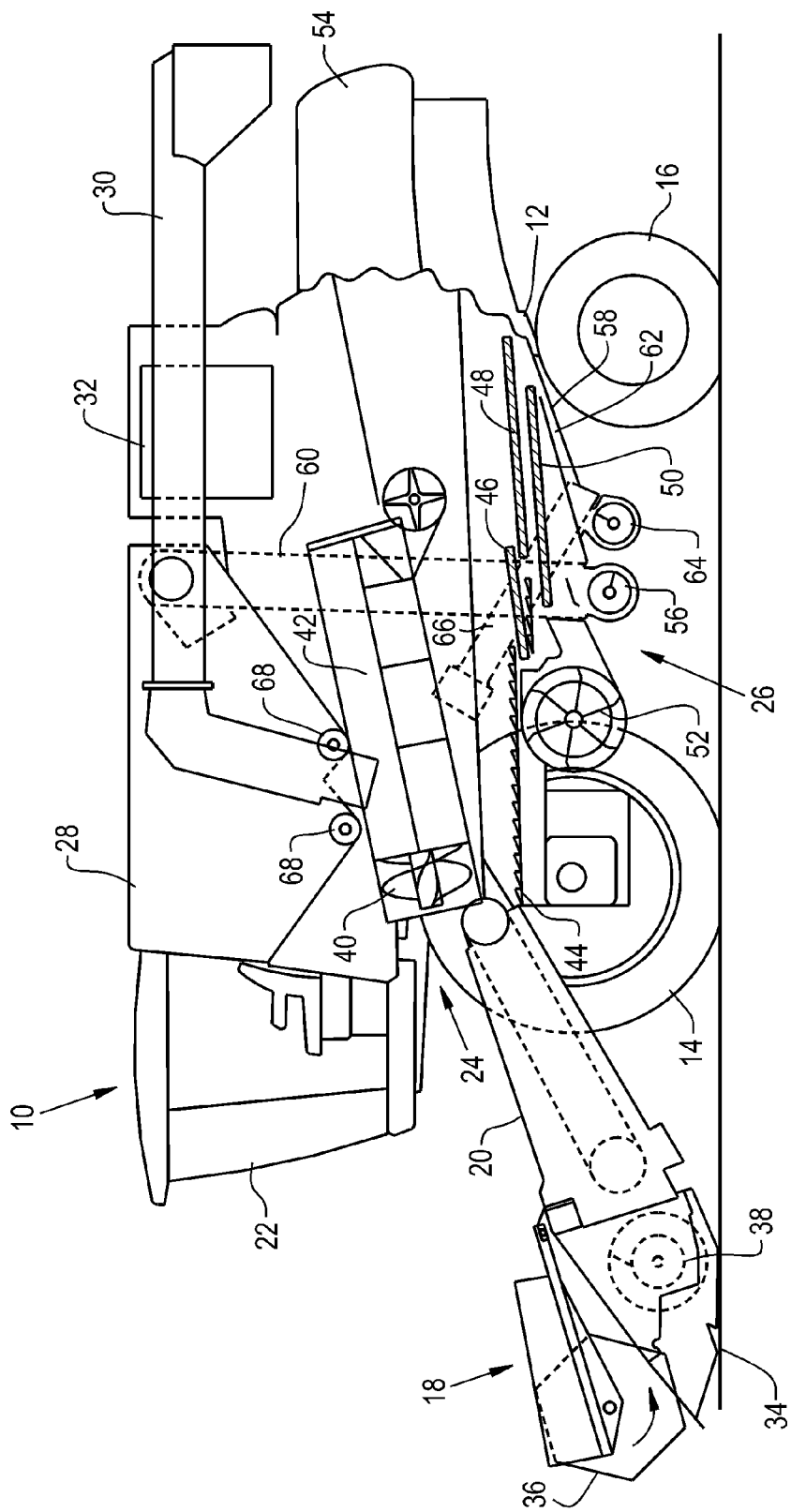
FIG. 1 is a side view of an embodiment of an agricultural harvester in the form of a combine, which includes an embodiment of a concave latch mechanism of the present invention.

Referring now to the drawings, and more particularly to FIG. 1, there is shown an agricultural harvester in the form of a combine 10, which generally includes a chassis 12, ground engaging front wheels 14 and rear wheels 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, it is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Rotor 40 is shown in a representative sense in that rotor 40 may be more than one rotor 40 and may be oriented generally in line with the direction of travel of combine 10. So also, concave 42 can be more than one concave 42, or more than one concave section commonly referred to as concaves.

Grain that has been separated by threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48, and 50 is subjected to a cleaning action by fan 52, which provides an airflow through the sieves to remove chaff and other lightweight impurities, such as dust, from the grain by making the lightweight material airborne for discharge from a straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in fore-to-aft manner to spread the grain across sieves 48, 50, while permitting the passage of cleaned grain by gravity through the openings of sieves 48, 50.

Clean grain falls to a clean grain auger 56 positioned crosswise below and at the front of lower sieve 50. Clean grain auger 56 receives clean grain from each sieve 48, 50 and from a bottom pan 62 of cleaning system 26. Clean grain auger 56 conveys the clean grain laterally to a generally vertically arranged grain elevator 60 for transport to the grain tank 28. Tailings from cleaning system 26 fall to a tailings auger trough 58, and are transported via a tailings auger 64 and a return auger 66 to the upstream end of the cleaning system 26 for repeated cleaning action. A pair of grain tank augers 68 at the bottom of the grain tank 28 convey the clean grain laterally within the grain tank 28 to the unloading auger 30 for discharge from combine 10.

The non-grain crop material proceeds through a residue handling system leading to discharge from straw hood 54. The residue handling system can include a chopper, counter knives, a windrow door and a residue spreader, not shown but well understood and familiar to those skilled in the art.

Figure 2:
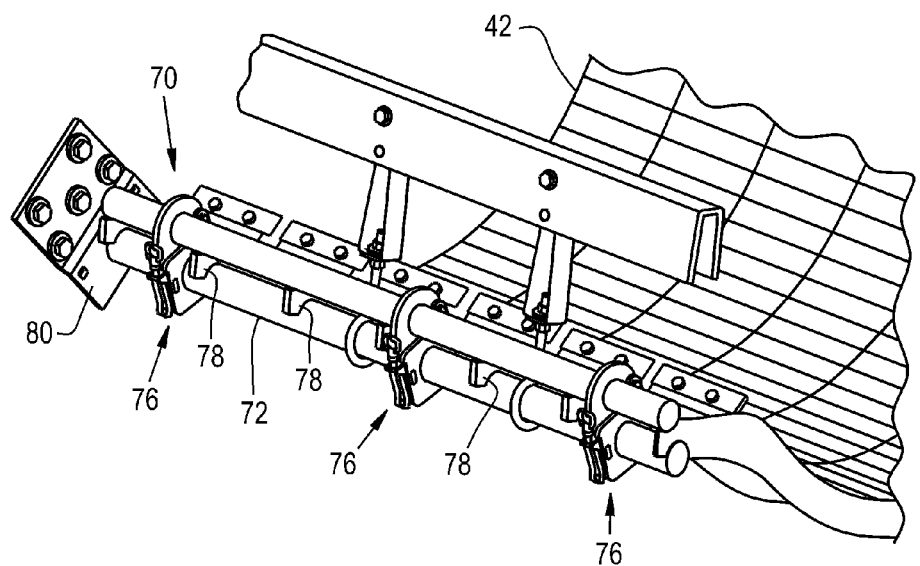
FIG. 2 is a perspective view of a portion of the threshing or separating system of the combine.
Figure 3:
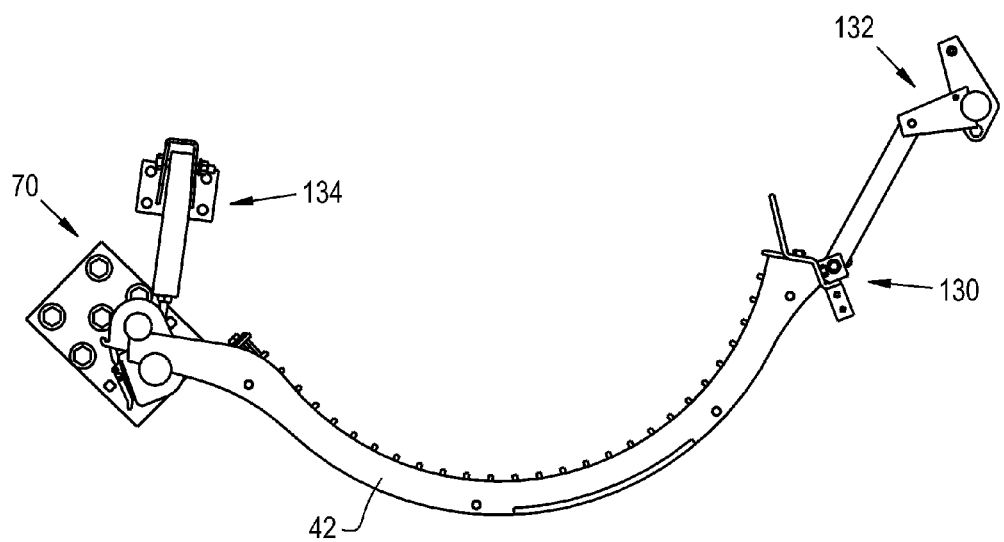
FIG. 3 is an elevational view of a portion of the threshing or separating system.
Figure 4:
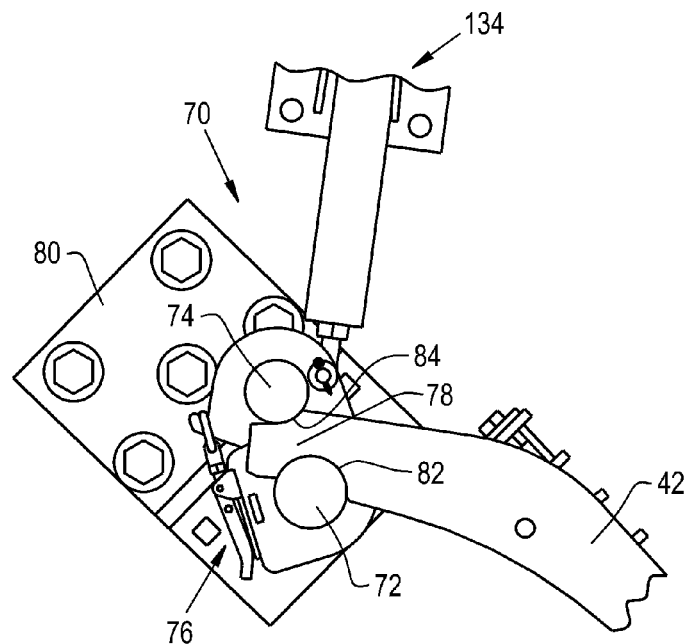
FIG. 4 is an enlarged fragmentary elevational view of a concave securing mechanism in the threshing system.

Now, additionally referring to FIGS. 2 through 4, there is shown a concave securing mechanism 70 by which concave 42 is held in position in threshing system 24. Securing mechanism 70 includes a support component in the form of a support bar 72, a clamping or securing component in the form of a movable clamping bar 74 and a plurality of latch mechanisms 76 interconnecting support bar 72 and clamping bar 74. In closed or secured positions of latch mechanisms 76, support bar 72 and clamping bar 74 are secured against bottoms and tops, respectively, of a plurality of securement portions 78 of concave 42. In the exemplary embodiment shown, three latch mechanisms 76 are used; however, it should be understood that specific applications of a concave securing mechanism 70 hereof may use more or fewer latch mechanisms 76.

More specifically, support bar 72 is fastened in a fixed location relative to a frame assembly 80 of threshing and separating system 24, which is supported by chassis 12. While fixed in location, support bar 72 is rotatable about the longitudinal axis thereof. Support bar 72 is both strong and rigid, providing a firm support for concave 42. Securement portions 78 of concave 42 are lateral extensions of concave 42, and are configured to rest on and against support bar 72. Accordingly, each securement portion 78 defines a curved lower edge 82 conforming to at least a portion of the surface of support bar 72 so as to engage support bar 72 while allowing support bar 72 to rotate relative thereto even when the securement portions 78 are placed on and resting against support bar 72, which is supporting the weight of concave 42.

Clamping bar 74 is movable relative to support bar 72 and frame assembly 80, and is sufficiently strong and rigid so as to apply clamping load against the top of securement portions 78. Accordingly, each securement portion 78 defines a shaped upper edge 84 to be engaged by clamping bar 78. With latch mechanisms 76 closed, as will be described hereinafter, each securement portion 78 is sandwiched between support bar 72 there below and clamping bar 74 there above, to be held in fixed positions relative to frame assembly 80.

Figure 5:
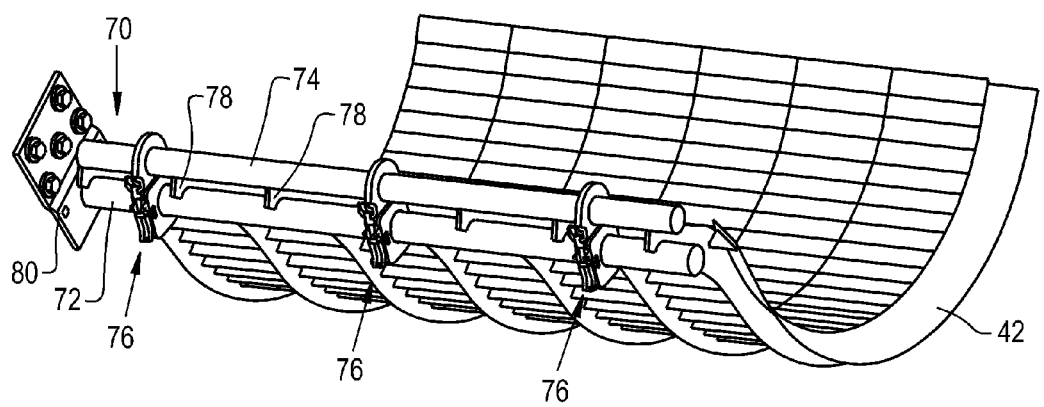
FIG. 5 is another perspective view of a portion of the threshing system.
Figure 6:
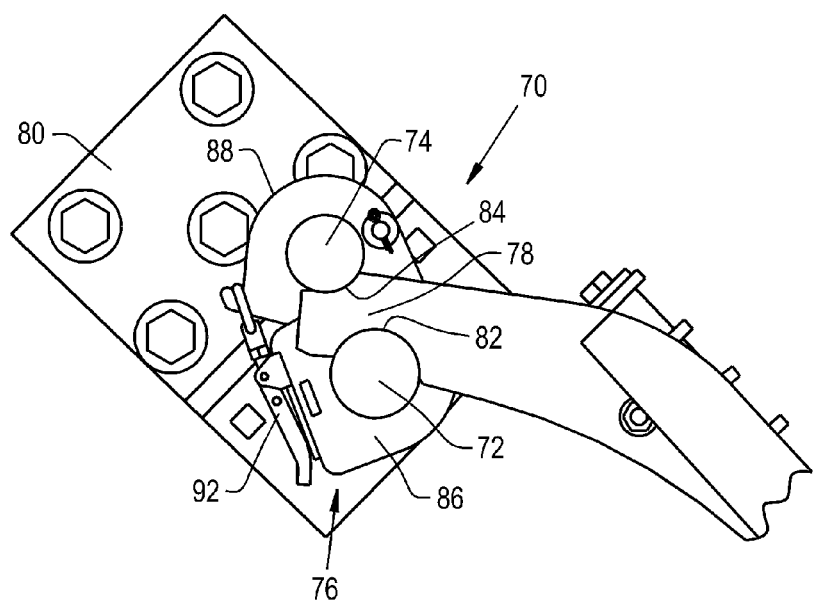
FIG. 6 is another fragmentary elevational view of a portion of the concave securing mechanism.

FIGS. 5 & 6 illustrate the relative positions of concave securing mechanism 70 and concave 42 with latch mechanisms 76 in closed or locked conditions. The configuration shown in FIGS. 5 & 6 is generally the operating condition for combine 10, with concave 42 locked into position as a result of clamping force provided by clamping bar 74 against securement portions 78, which are engaged against support bar 72.

Figure 7:
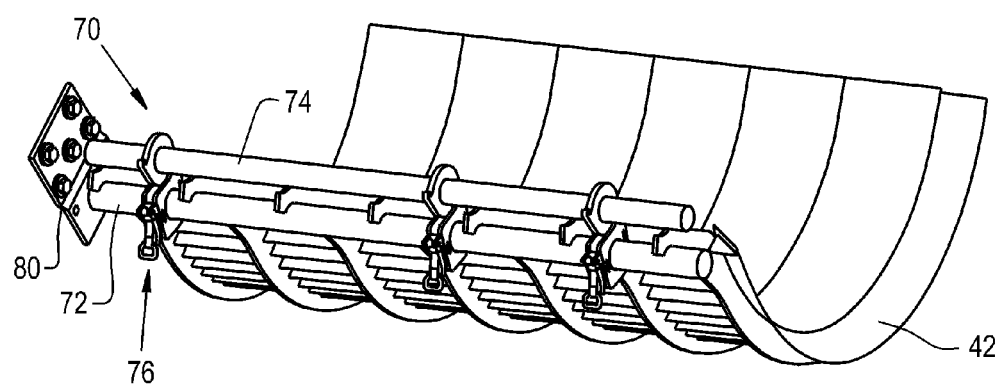
FIG. 7 is a perspective view similar to that of FIG. 5, but illustrating the threshing system in a different maintenance condition.
Figure 8:
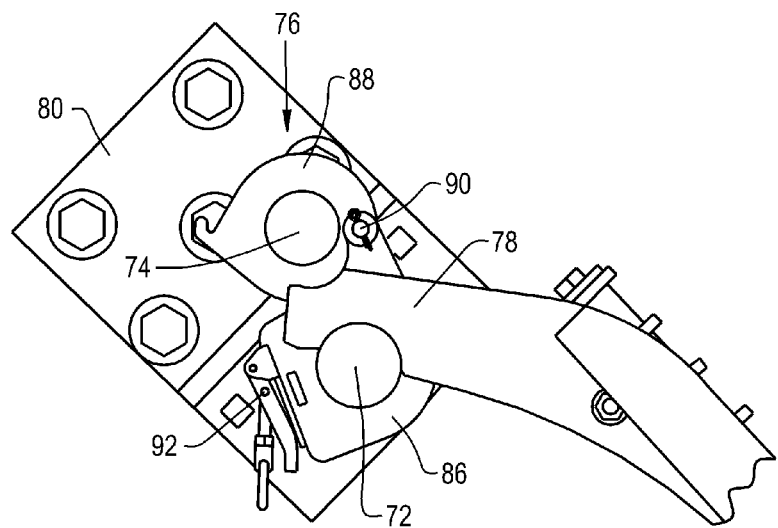
FIG. 8 is a fragmentary elevational view similar to that of FIG. 6, but illustrating the concave securing mechanism in the maintenance condition shown in FIG. 7.

FIGS. 7 & 8 illustrate the relative positions of concave securing mechanism 70 and concave 42 when latch mechanisms 76 are initially adjusted to open or unlocked conditions. The configuration shown in FIGS. 7 & 8 is the initial release condition of latch mechanisms 76, wherein clamping force against securement portions 78 is released, and clamping bar 74 is disengaged from securement portions 78.

Figure 9:
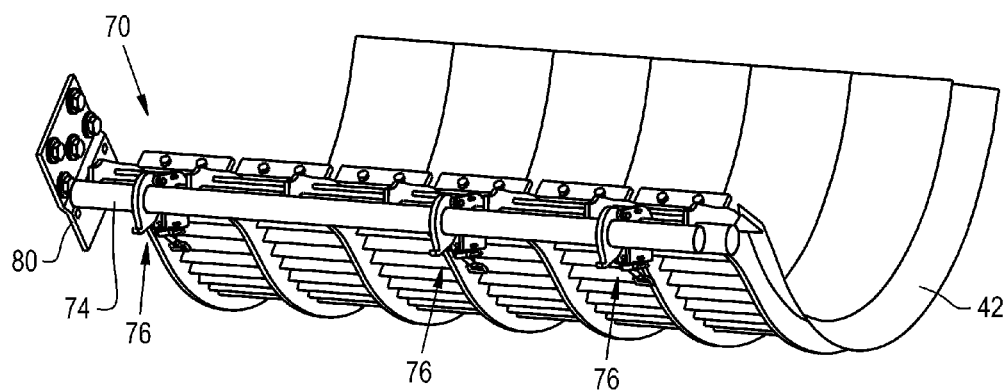
FIG. 9 is a perspective view similar to those of FIGS. 5 & 7, but illustrating the threshing system in yet another maintenance condition.
Figure 10:
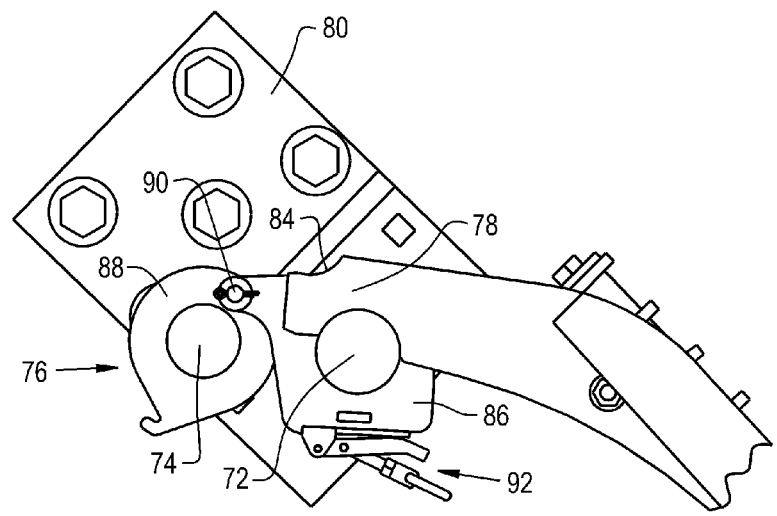
FIG. 10 is an elevational view similar to those of FIGS. 6 & 8, but illustrating the concave securing mechanism in the maintenance condition shown in FIG. 9.

FIGS. 9 & 10 illustrate the relative positions of concave securing mechanism 70 and concave 42 with latch mechanisms 76 open or unlocked as in FIGS. 7 & 8; but with further adjustment of securing mechanism 70 to allow removal of concave 42. Support bar 72 has been rotated to pivot clamping bar 74 away from securement portions 78. The configuration shown in FIGS. 9 & 10 has the upper, movable portions of latch mechanisms 76 moved fully out of the way so that concave 42 can be removed for repair or replacement.

As illustrated in the series of FIGS. 5-10, the components of securing mechanism 70 remain connected within combine 10 and do not need to be removed when disengaging a concave 42 that is being removed from the combine. Accordingly, all parts remain connected and available to re-engage a reinstalled or replacement concave.

Figure 11:
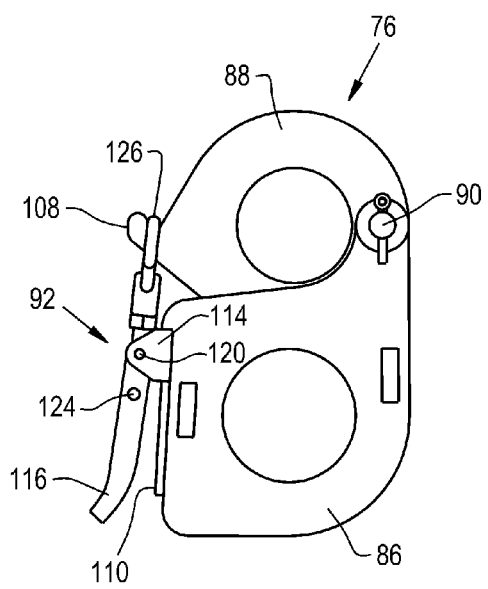
FIG. 11 is a larger elevational view of a latch mechanism used in the concave securing mechanism shown in the previous drawings.
Figure 12:
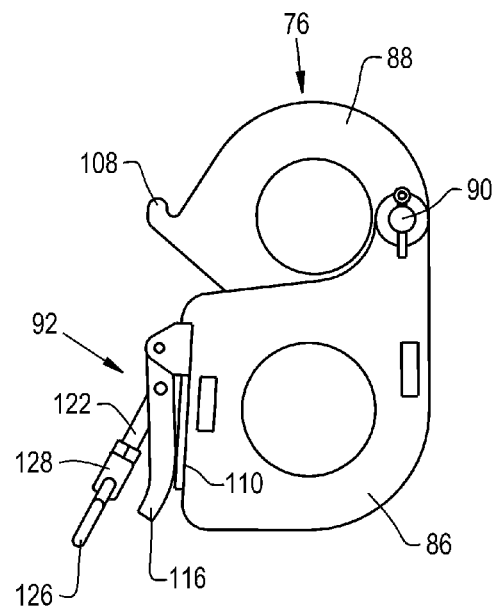
FIG. 12 is an elevational view of the latch mechanism shown in FIG. 11, but illustrating the latch mechanism disengaged.
Figure 13:
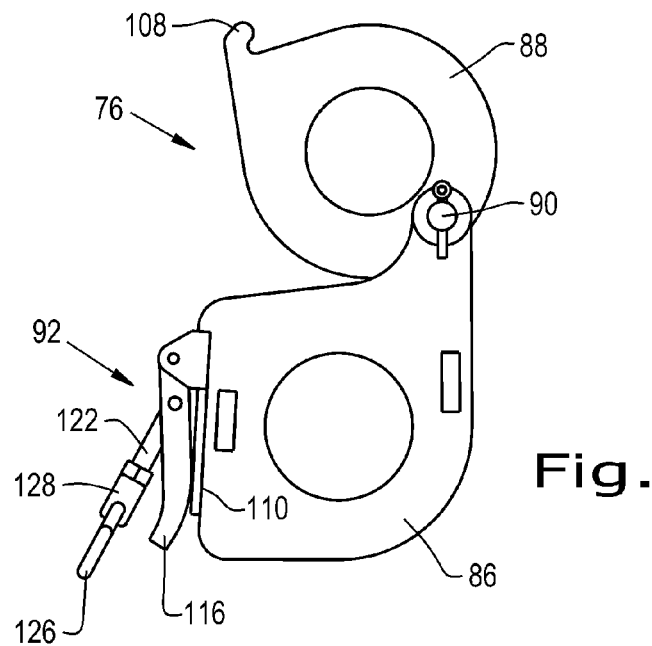
FIG. 13 is an elevational view of the latch mechanism shown in FIGS. 11 & 12; but illustrating the latch mechanism in the condition of FIGS. 7 & 8.

Latch mechanisms 76 extend between and are connected to support bar 72 and clamping bar 74. All of the latch mechanisms 76 are similar to one another in both construction and operation. FIGS. 11-13 illustrate one of the latch mechanisms 76 in latched, unlatched and partially opened conditions, respectively.

Figure 14:
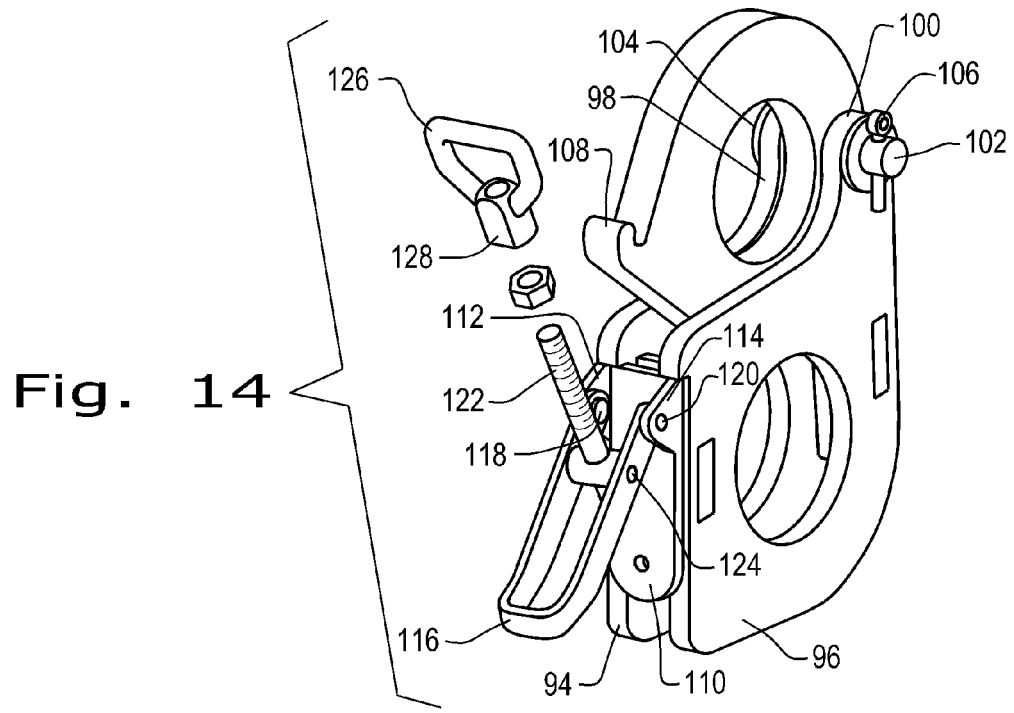
FIG. 14 is an exploded view of the latch mechanism.

Now referring more specifically to FIGS. 11-13 and particularly to FIG. 14, one of the latch mechanisms 76 is shown and will be described. In the exemplary embodiment shown and described herein, each latch mechanism 76 includes a lower bracket 86 connected to support bar 72, and a collar 88 connected to clamping bar 74. Collar 88 is connected to bracket 86 at a pivotal connection 90 at one side of latch mechanism 76, and a quick-release, over center latch 92 is operable between bracket 86 and collar 88 generally at an opposite side of latch mechanism 76 from pivotal connection 90.

More specifically, in the exemplary embodiment shown, bracket 86 includes spaced first and second plates 94, 96 engaged on support bar 72 and defining extensions 98, 100 near confronting corners thereof. Collar 88 is a body having a thickness so as to fit between first plate 94 and second plate 96 and particularly between first and second extensions 98, 100 thereof. A pivot pin 102 including a head 104 connects collar 88 to bracket 86 pivotally. Pivot pin 102 extends through extension 98, collar 88 and extension 100, and is held or secured by a key 106 at the opposite end of pin 102 from head 104. Accordingly, collar 88 is sandwiched between first plate 94 and second plate 96 and is held about a pivotal axis defined by pivot pin 102. As a result, clamping bar 74 is allowed to move relative to support bar 72 in that collar 88 pivots relative to bracket 86, collar 88 pivoting about the axis defined by pivot pin 102. It should be understood that the pivotal connection 90 between bracket 86 and collar 88 shown and described herein is merely exemplary, and other types of pivotal connections and structures can be used.

At an opposite side of collar 88 from pivotal connection 90, collar 88 defines a hook 108 opening generally upwardly and generally in line with latch 92.

Quick-release, over center latch 92 includes a base 110 secured relative to first and second plates 94, 96 and including spaced tabs 112, 114 extending from base 110. A handle 116 is connected to tabs 112, 114 at pivotal connections 118, 120, respectively, near one end of the handle 116. A pivot arm 122 is connected to handle 116 about a pivotal connection 124 spaced from pivotal connections 118, 120. A ring 126 is provided at the distal end of pivot arm 122 and is configured to engage hook 108. Arm 122 can be a threaded arm 122 configured to engage a threaded base 128 of ring 126, so that an effective overall length or arm 122 from pivotal connection 124 to ring 126 can be adjusted by rotating base 128 more deeply or more shallowly onto threaded arm 122.

As described above, latch 92 is a so-called "over center" latch. With pivotal connections 118, 120 spaced away from base 110 by tabs 112, 114; the latch is self-securing when handle 116 is rotated downwardly toward or even against base 110, when ring 126 is engaging hook 108. Over center latches can be operated quickly and easily both when latching and when unlatching, and generally tools are not required for operating the latches. The latches can be operated much more quickly than common threaded fasteners, such as bolts, thereby expediting and simplifying the process for removing and installing concaves. Further, latches 92 draw together support bar 72 and clamping bar 74 against securement portions 78 with a desired clamping force by adjusting the effective length of pivot arm 122 as described above. Proper adjustment ensures a proper, desired clamping force, reducing the risk of either over-tightening or under-tightening as can occur when threaded fasteners, such as bolts, are used.

At an opposite end of concave 42 from concave securing mechanism 70, the concave is held by an anchor structure 130, and adjustment mechanisms 132, 134 are provided for adjusting an overall position of concave 42 within threshing system 24 and particularly with respect to rotor 40 thereof. Various types and constructions of anchor structure 130 and adjustment mechanisms 132, 134 can be used, as those skilled in the art will understand readily.

In the use of a concave securing mechanism 70 when removing an installed concave 42, from the position shown in FIGS. 1-6, each latch 92 is released by lifting the handles 116 thereof, thereby elevating the rings 126 so that the rings 126 can be disengaged from the hooks 108. Clamping force against securement portions 78 is thereby released. Clamping bar 74 is disengaged from securement portions 78 and is moved away by rotating collars 88 about pivotal connections 90 to the position illustrated in FIGS. 7 & 8. Thereafter, support bar 72 is rotated about its axis to move clamping bar 74 and latch mechanisms 76 laterally away from concave 42. Accordingly, as shown most clearly in FIGS. 9 & 10, concave 42 is no longer restricted by clamping bar 74 and collar 88 from above and can be slid along and/or lifted away from support bar 72 for removal from the combine 10.

When concave 42 or a new concave 42 is being installed, the securement portions 78 thereof are rested on support bar 72, with clamping bar 74 and latch mechanisms 76 generally in the positions illustrated in FIGS. 9 & 10. With the concave positioned on support bar 72, support bar 72 is rotated, but in the opposite direction from that described prior to removing concave 42, until reaching generally the position shown in FIGS. 7 & 8. Clamping bar 74 is placed against the shaped upper edges 84 of securement portions 78, each handle 106 is lifted to elevate arms 122 and rings 126 are engaged over hooks 108. Handles 116 are moved downwardly to supply clamping force from clamping bar 74 against securement portions 78 supported on support bar 72.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester comprising:
    a chassis;
    a threshing system carried by said chassis, said threshing system including:
        a rotor;
        a frame assembly;
        a concave including a securement portion; and
        a securing mechanism connecting said concave to said frame assembly, said securing mechanism including a support component in a fixed location relative to said frame assembly, a securing component movable relative to said support component, and a tool-less latch mechanism interconnecting said support component and said securing component with said securement portion captured between said support component and said securing component, the tool-less latch mechanism comprising a pivot having a first pivot axis for pivoting the securing component in a first direction away from the support component to release the securement portion from between the support component and the securing component, the tool-less latch mechanism pivotal about a second pivot axis offset from the first pivot axis for pivoting the securing component in a second direction different from the first direction.

2. The agricultural harvester of claim 1, wherein said support component is an axially rotatable support bar.

3. The agricultural harvester of claim 1, wherein said securing component is a clamping bar pivotally connected to said support component.

4. The agricultural harvester of claim 1, wherein said support component is a rotatable first bar, and said securing component is a clamping bar pivotally connected to said rotatable first bar via the pivot.

5. The agricultural harvester of claim 4, wherein said clamping bar is pivotally connected to said first bar by said tool less latch mechanism.

6. The agricultural harvester of claim 4, wherein said securement portion has a concave edge engaging said first bar.

7. The agricultural harvester of claim 4, wherein said tool-less latch mechanism includes a bracket connected to said first bar, a collar connected to said clamping bar, and an over center latch interconnecting said bracket and said collar, wherein the pivot pivotally connects the collar and the bracket.

8. The agricultural harvester of claim 7, wherein said over center latch is connected to said bracket, said over center latch includes an arm having a ring at an end thereof, and said collar defines a hook engaged by said ring.

9. The agricultural harvester of claim 8, wherein said arm has an adjustable length.

10. The agricultural harvester of claim 8, said over center latch including a base, a handle pivotally connected to said base, and a pivotal connection of said arm to said handle.

11. A threshing system of an agricultural harvester, said threshing system including:
    a frame assembly;
    a concave including a plurality of securement portions; and
    a securing mechanism connecting said concave to said frame assembly, said securing mechanism including:

a support bar axially rotatable at a fixed location relative to said frame assembly, said support bar engaging and supporting said plurality of securement portions;

a clamping bar movable relative to said support bar and applying clamping force against said plurality of securement portions, said support bar and said clamping bar disposed on opposite sides of said securement portions; and a tool-less latch mechanism interconnecting said support bar and said clamping bar, the tool-less latch mechanism comprising a pivot having a first pivot axis for pivoting the clamping bar in a first direction away from the support bar to release the plurality of securement portions from between the support bar and the clamping bar, the tool-less latch mechanism pivotal about a second pivot axis offset from the first pivot axis for pivoting the clamping bar in a second direction different from the first direction.

12. The threshing system of claim 11, wherein said clamping bar is pivotally connected to said support bar by said tool less latch mechanism.

13. The threshing system of claim 11, wherein said securement portion has a concave edge engaging said first bar.

14. The threshing system of claim 11, wherein said tool-less latch mechanism includes a bracket connected to said support bar, a collar connected to said clamping bar, and an over center latch, wherein the pivot pivotally connects the collar and the bracket, and wherein the over center latch interconnects said bracket and said collar along sides of said bracket and said collar opposite said pivotal connection between said collar and said bracket.

15. The threshing system of claim 14, wherein said over center latch is connected to said bracket, said over center latch includes an arm having a ring at an end thereof, and said collar defines a hook engaged by said ring.

16. The threshing system of claim 15, wherein said arm has an adjustable length.

17. The threshing system of claim 16, said over center latch including a base, a handle pivotally connected to said base, and a pivotal connection of said arm to said handle.

18. A securing mechanism connecting a concave to a frame assembly in an agricultural combine; said securing mechanism comprising:

a plurality of securement portions extending from the concave;

a support bar axially rotatable at a fixed location relative to the frame assembly, said support bar engaging and supporting said plurality of securement portions resting thereon;

a clamping bar movable relative to said support bar and applying clamping force against said plurality of securement portions, said support bar and said clamping bar disposed on opposite sides of said securement portions; and a latch mechanism pivotally connecting said clamping bar to said support bar, the latch mechanism comprising a pivot having a first pivot axis for pivoting the clamping bar in a first direction away from the support bar to release the securement portion from between the support bar and the clamping bar, the tool-less latch mechanism pivotal about a second pivot axis offset from the first pivot axis for pivoting the clamping bar in a second direction different from the first direction.

19. The securing mechanism of claim 18, wherein said latch mechanism includes a bracket connected to said support bar, a collar connected to said clamping bar, and an over center latch interconnecting said bracket and said collar along sides of said bracket and said collar opposite said pivotal connection between said collar and said bracket, wherein the pivot pivotally connects the collar and the bracket.

20. The securing mechanism of claim 19, wherein said over center latch includes a base connected to said bracket, a handle pivotally connected to said base, an adjustable length arm pivotally connected to said handle, and a ring at an end of said arm; and said collar defines a hook engaged by said ring.

* * * * *